United States Patent [19]

Kermabon

[11] 4,103,158

[45] Jul. 25, 1978

[54] METHOD AND APPARATUS FOR GEOPHYSICAL PROSPECTING BY RADIOACTIVE DIAGRAPHY

[75] Inventor: André J. Kermabon, Marseille, France

[73] Assignee: Syminex, Marseilles, France

[21] Appl. No.: 732,601

[22] Filed: Oct. 15, 1976

[30] Foreign Application Priority Data

Oct. 31, 1975 [FR] France ................................. 75 34024

[51] Int. Cl.² .............................................. G01V 5/00
[52] U.S. Cl. ..................................... 250/269; 250/256
[58] Field of Search ................................. 250/269, 256

[56] References Cited

U.S. PATENT DOCUMENTS

| 2,692,949 | 10/1954 | McKnight | 250/269 |
| 3,205,356 | 9/1965 | Owen | 250/270 |

*Primary Examiner*—Harold A. Dixon
*Attorney, Agent, or Firm*—Lewis H. Eslinger

[57] ABSTRACT

The invention relates to method and apparatus for geophysical prospecting by radioactive diagraphy of a drillhole, using a probe containing a radioactive source and one or two detectors of delayed particles emitted by the terrain bombarded by the said source. The source is moved periodically, within the probe, vertically away from the detector, and the detector is moved, in synchronism with the said source, in order to locate it opposite the zone which has just been bombarded.

9 Claims, 8 Drawing Figures

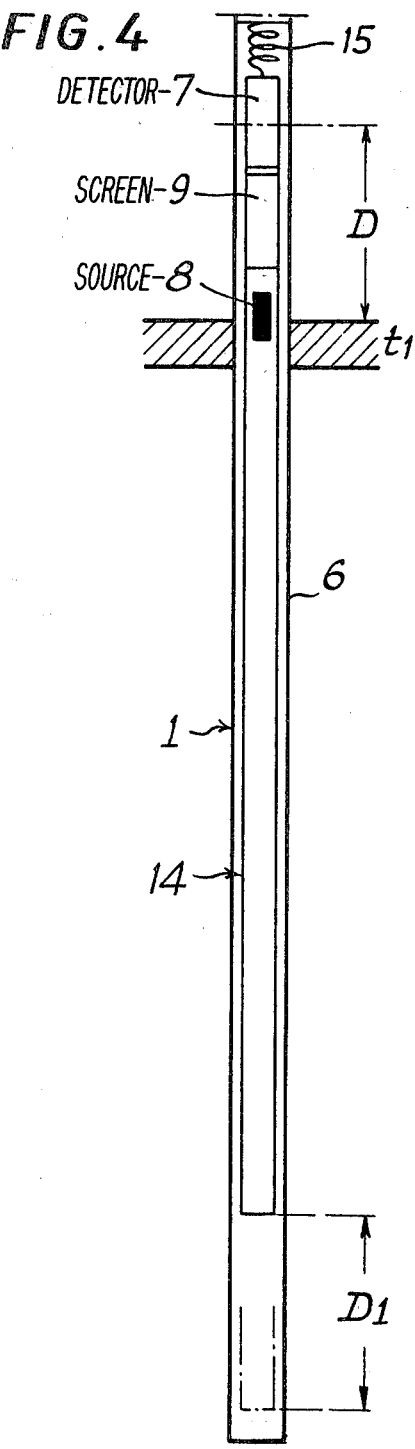
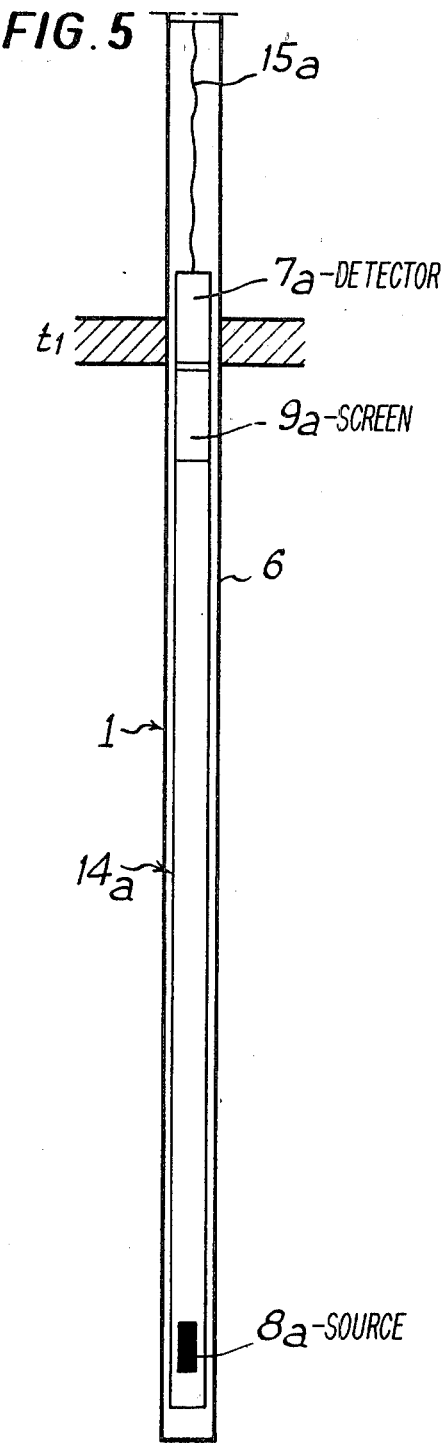

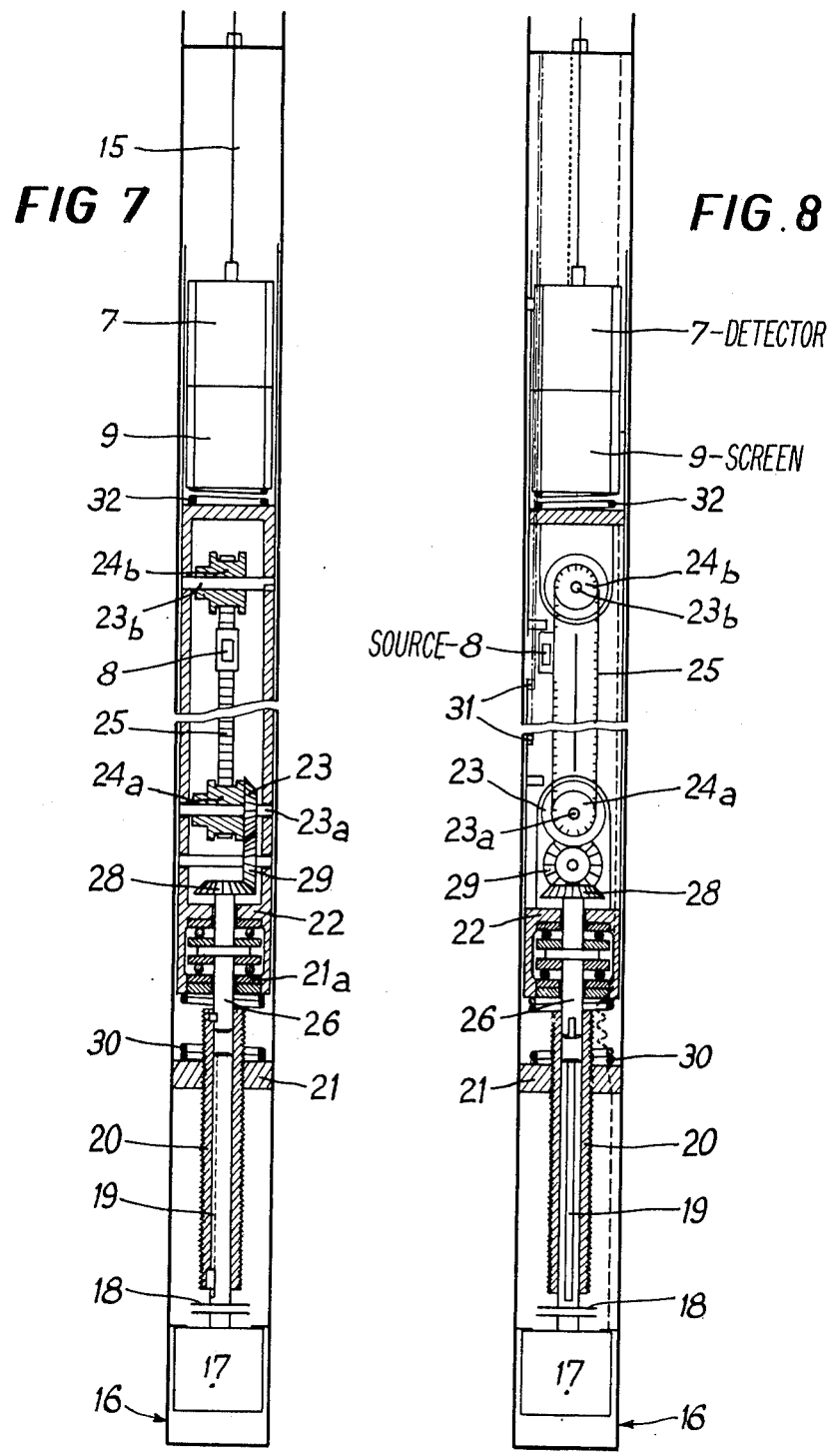

METHOD AND APPARATUS FOR GEOPHYSICAL PROSPECTING BY RADIOACTIVE DIAGRAPHY

BACKGROUND OF THE INVENTION

The present invention relates to method for geophysical prospecting by radioactive diagraphy, and to apparatus for the execution of these methods.

Various methods and pieces of equipment for geophysical prospecting by radioactive diagraphy are known, in which a probe comprising a radioactive source is displaced vertically in a drill-hole, the said radioactive source bombarding the surrounding terrain, and one or more particle detectors which detect the particles emitted by the terrain, thus making it possible to collect information relating to the nature thereof.

The said radioactive sources may be pulsed neutron generators, the functioning of which may be periodically interrupted in order to measure the delayed neutrons or gamma-rays emitted by the isotopes originating in the terrain as a result of the neutron bombardment.

However, pulsed neutron generators are costly and cumbersome.

The radioactive sources may also be radioactive elements, for example a fragment of californium 252. In this case, it has already been suggested that the delayed particles be measured by periodically moving the said source away from the detector within the probe, while the probe is being displaced in a continuous movement. This method makes it possible to use small amounts of radioactive elements which may be accommodated in small-diameter probes which are particularly suitable for drill-holes used in mining research.

It is to be understood that the radioactive sources may be sources of neutrons or gamma-rays at any level of energy, and that the particle detectors may be of any type known for detecting either gamma-rays (photons), or neutrons, or both.

Known methods of radioactive diagraphy, whereby the radioactive source is periodically displaced within the probe in order to vary the vertical distance separating the source from the detector, in the case of a single detector, or separating the said source from each of the detectors, in the case of detectors located on each side of the source, have disadvantages since, while the delayed radiations are being measured, the detector is not located precisely opposite the terrain which has just been bombarded, but at a distance therefrom equal to the minimal thickness of the screen separating the source from the detector, which is of the order of 30 to 40 cm. This distance reduces the sensitivity of the apparatus and makes it impossible to detect isotopes having very short lives.

It is an aspect of the present invention to perfect known methods and apparatus, in order to overcome this disadvantage, and to make it possible, while retaining the continuous displacement of the probe, to measure the induced radioactivity immediately after the end of the bombardment, the detector being located opposite the zone which has just been bombarded by the source.

Accordingly, this invention provides a geophysical prospecting method using radioactive diagraphy in a drill-hole, said method comprising the steps:
vertically displacing in the said drill-hole a probe comprising a radioactive source and at least one particle detector separated by a screen,
simultaneously displacing said source within the probe, for the purpose of periodically varying the vertical distance separating the source from said at least one detector,
while the source is remote from said at least one detector, using the detector to measure the delayed radiations, having a specific energy, which are emitted by the terrain bombarded by the source during the time when the latter was close to the said detector,
and periodically displacing said at least one detector vertically within the tube in synchronism with the said source.

The purpose of the invention is achieved by displacing each detector periodically and vertically within the probe, in synchronism with the source.

Each detector is preferably displaced vertically in the same direction as the source and by a distance less than that by which the source is displaced.

Each detector may, with advantage, be displaced by means of a reciprocating motion of an amplitude substantially equal to the minimal distance separating the source from the said detector when they are close together.

A probe according to the invention may be associated with electronic measuring circuits comprising a precision analyzer which makes it possible to count pulses due solely to well-defined energy particles.

A diagraphy probe according to the invention may be displaced in continuous motion and at a certain speed which is independent of the life of the isotopes under study. The probe may also be displaced intermittently, always in the same direction, by halting the movement of the probe while the particle source is remote from the detector.

In both cases a semi-continuous diagraph of a sounding is obtained. The diagraph may be taken while the probe is descending. In this case the particle source is located below the detector, and the probe comprises a downward extension which allows the source to be moved away from the detector.

The diagraph may also be taken while the probe is ascending. In this case the detector is located below the source and the probe comprises an upward extension making it possible to move the source away from the detector. This second solution has the advantage of making it possible to obtain a diagraph extending to the bottom of the drill-hole.

The following description relates to the drawings attached hereto and illustrating, in no way restrictively, examples of embodiment of the invention.

BRIEF DESCRIPTION OF THE DRAWINGS

FIGS. 4 and 5 are longitudinal sections illustrating diagrammatically a method according to the invention;
FIGS. 7 and 8 are longitudinal sections, in two vertical planes, of a part of the probe according to the invention.

SUMMARY OF THE INVENTION

Figure 1:
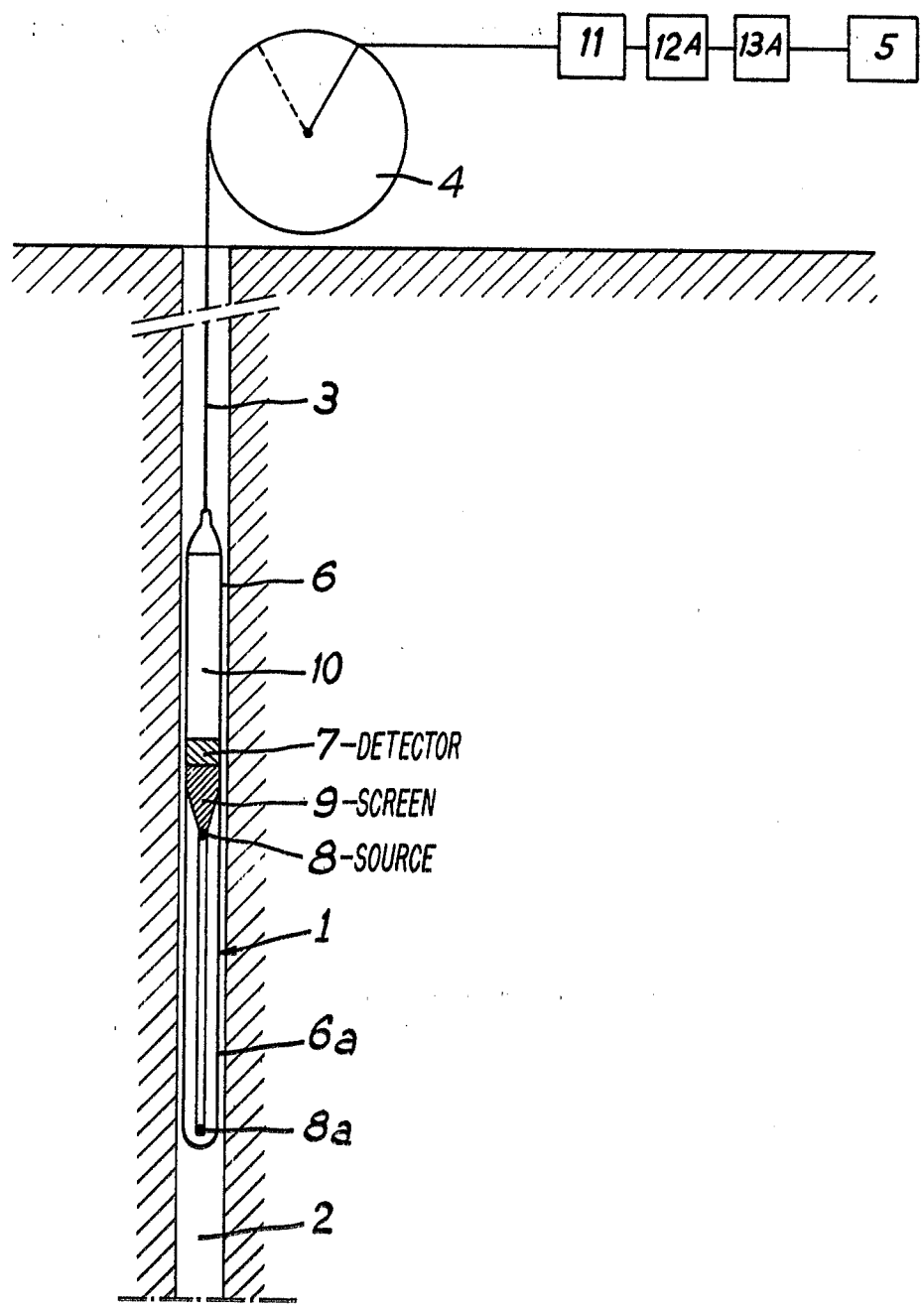
FIG. 1 is a diagrammatic layout of a known method.

FIG. 1 is a diagrammatic representation of a known device. The said device comprises, in known fashion, a probe 1 which is inserted into a drill-hole 2 and is connected to the surface by an electrically-conductive cable 3 passing over a hoisting drum which allows probe 1 to be displaced in the drill-hole. It also comprises a recorder 5 which registers continuously one or more measurements taken by probe 1. The movement of recorder 5 is co-ordinated with that of drum 4, so that the abscissae correspond to depth. The recordings thus obtained are sounding diagraphs.

A probe according to the invention consists of a hollow cylindrical element 6, the outside diameter of which is less than the inside diameter of the drill-hole, for example 42 mm. Casting 6 contains a particle detector 7, for example a detector sensitive to gamma radiation and having a response which is a function of these radiations.

A sodium-iodide scintillator associated with a photomultiplier may be used for this gamma-photon detector.

Detector 7 may be of any known type; it may also be a neutron detector.

Element 6 also contains a particle source 8, for example a neutron source consisting of a fragment, weighing a few micrograms, of californium 252 which emits 2.5 MeV neutrons, or a mixture of americium 241 and beryllium which emits 4 to 4.5 MeV neutrons. Any other source of known radioactive particles may be used.

In order to simplify the explanation, a description will be given hereinafter, by way of example, of a probe containing a neutron source consisting of californium 252 and a gamma-photon detector, but it is to be understood that this choice is not intended in any way to restrict the invention which covers any known radioactive source and any known detector that can be used in a probe.

A screen 9, made of any suitable material, is placed between source 8 and detector 7 in order to prevent direct transmission of radiation between the source and the detector. The probe also contains electronic circuits supplied from the surface with continuous current stabilized by cable 3. These circuits supply stabilized high tension current to detector 7, amplifying the pulses reaching the said detector and transmitting them to the surface through cable 3.

At the surface, electronic circuits 11, known to one skilled in the art, filter, shape and amplify the pulses arriving from detector 7. Pulses issuing from circuits 11 pass through a channel 12A comprising a pulse analyzer and adjusted to pass only pulses of an amplitude corresponding to the gamma-photons being investigated. The pulses are then converted by a counter 13a into a direct current which varies according to the number of pulses received per unit of time. The record of this direct current, produced by recorder 5, is the radioactive diagraph of the drill-hole.

FIG. 1 illustrates the case in which the diagraph is taken during the descending movement of the probe, but the diagraph may also be taken during the ascending movement, in which case the relative positions of detector 7 and source 8 are reversed.

Probe 1 has an extension 6a of hollow element 6, beyond the source and on the side thereof remote from the detector, i.e. towards the bottom in the case of FIG. 1. This extension makes it possible to move source 8 within element 6 between a first position 8 and a second position 8a, each at one end of extension 6a. The length of extension 6a varies between 1 and 5 m, depending upon the nature and humidity of the terrain through which it passes. This length should, however, be greater than the shortest distance separating source 8 from detector 7, under operating conditions, so that the radiation emitted by the source has no direct influence upon the said detector.

Figure 3:
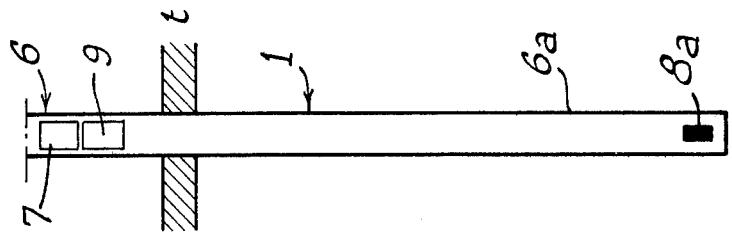
FIGS. 2 and 3 illustrate diagrammatically the principle of a known method.
Figure 2:
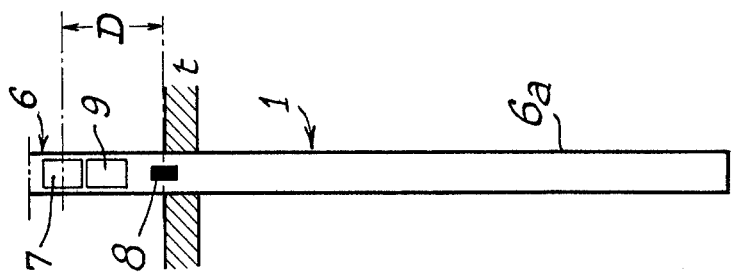

FIGS. 2 and 3 are diagrams of the lower part of probe 1, and are given for the purpose of explaining the method. In these diagrams, parts similar to those in FIG. 1 bear the same reference numerals. Shown in these diagrams is a part of probe element 6 containing a detector 7 and a particle source 8, separated by a screen 9. FIG. 2 shows the source in a first position adjacent the screen, in this case at a minimum distance therefrom, for example about 30 or 40 cm. This distance is sufficient to ensure that the detector will collect only radiations arriving from the surrounding terrain, and not those issuing directly from the source. In this position, the source irradiates the surrounding terrain which, in turn, emits instant radiations.

The source remains in this first position for a period of time T1, for example a few seconds. The intensity of irradiation, and therefore the activity of the surrounding terrain, increases with T1 exponentially.

With source 8 in this position, probe 6 continues to move — in a downward direction in the figure — at a relatively slow speed, for example at a speed "v" of the order of 1 cm/sec., so that source 8 sweeps a sounding section "t" having a height of V·T1 of the order of a few centimeters, during this phase of the irradiation.

At the end of a time T1, source 8 is moved rapidly away from the detector and into the position 8a shown in FIG. 3. This movement is carried out in a very short time, of the order of one second. FIG. 3 illustrates the delayed-radiation measuring phase, during which detector 7 actually captures only particles emitted by the radioactive isotopes, in the process of disintegration, originating in the surrounding terrain in the course of preceding irradiation phases.

Since the detector is located at a distance D, equal to between 30 and 40 cm, from position 8 of the source, it may be gathered from FIGS. 2 and 3 that, while the delayed radiations are being measured, the detector does not face the section of the drill-hole which was irradiated during the preceding half-cycle, and this may lead to mediocre results in detecting delayed emissions from isotopes having a relatively short life, of the order of a few seconds or tenths of seconds, for example.

FIGS. 4 and 5 illustrate diagrammatically a method according to the invention for overcoming this disadvantage.

In this case extension 6a of element 6 contains a hollow member 14 adapted to slide within element 6 over a length D1, and containing source 8, screen 9, and detector 7. Source 8 may move within member 14 between a first position 8, shown in FIG. 5, and a second position 8a, shown in FIG. 5.

FIG. 4 represents the phase of irradiation, with a duration T1, during which source 8 sweeps a section of terrain t1 having a height of v·T1, "v" being the speed at which the probe moves.

At the end of the irradiation phase, source 8a is moved quickly to position 8a and, at the same time, member 14 is moved, in the same direction, over the distance D1. This brings the detector into position 7a which is substantially that occupied by source 8 at the beginning of the phase of irradiation of section t1. Source 8a, and intermediate member 14a, remain in the position shown in FIG. 5 during a period of time T2. If T2 = T1, and if speed "v" of the probe remains constant, detector 7a sweeps exactly the same section t1 during this phase.

Distance D1, over which intermediate member 14 is moved, is slightly less than distance D separating the source from the detector, in order to take into account the distance travelled by the probe at speed "v". For example: $D1 = D - vT1$.

The distance travelled by the probe during the very short time taken to displace the source may be disregarded.

Since the speed at which the probe travels may have to be varied depending upon the kind of ore being sought, it is desirable to be able to adjust the amplitude of displacement D1 independently of the amplitude of the displacements of source 8 and member 14. To this end, detector 7 is attached to the end of a wire 15, the other end of which is secured to element 6 of the probe. The length of wire 15 is adjustable and may be less than D1. In FIG. 1 it will be seen that the wire is coiled. When member 14 descends, detector 7 follows it until wire 15a is straight, after which member 14a may continue to descend without varying detector 7 along.

Figure 6:
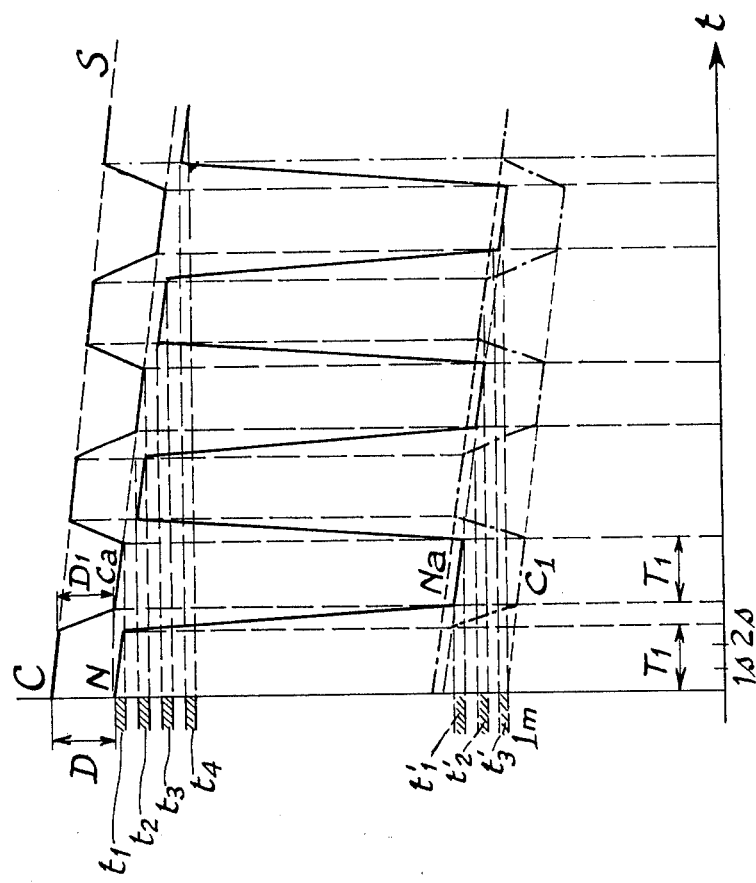
FIG. 6 is a diagram illustrating displacements of the probe, of the source, and of the detector in a method according to FIGS. 4 and 5.

FIG. 6 is a diagram showing the movements of probe S, detector D, and source N.

The abscissae represent time. The time starts at the beginning of a cycle coinciding with the start of a phase of irradiation.

Dotted lines S represent continuous descending movement of probe S at velocity "v", for example 2 cm/sec.

The upper broken line represents successive positions C and Ca of the detector.

The lower broken line represents successive positions N and Na of the neutron source. The durations of the irradiation phases, and of the periods during which delayed radiations are measured, are equal to T1. The duration of the displacement of the source and of the detector is one second. The amplitude of the displacement of the probe is 1.50 m.

The successive sections swept by source N during each cycle are shown at t1, t2, t3, t4. It will be noted that these sections are separated from each other by voids of substantially the same height as the sections, i.e. a few centimeters. However, these voids are irradiated, since the radiation from the source is sufficiently intense over a distance of several decimeters. These voids may, if necessary, be eliminated by moving the probe only during the phases of irradiation and keeping it stationary for the remainder of the time. The diagram represents the distance D between centers of source N and counter C, and the amplitude D1 of the displacements of counter C, which is slightly less than D because of the movement of the probe. The movements of source N and counter C are synchronized and in the same direction.

FIGS. 4, 5 and 6 relate to a method in which the probe has a single detector. It is to be understood that the method can also operate with a probe comprising two detectors, one on each side of the source, each detector being separated from the said source by a screen. In this case, the detectors are moved alternately away from the source, the phases of measuring the delayed radiations carried out by each detector thus alternating.

The two detectors are displaced in synchronism with the source and in the same direction.

The movements of the second detector, located above the source, are shown by the dot-dash line in FIG. 6.

In this case, the amplitude of the vertical movements of the source may be such that sections t'1, t'2, t'3 . . . etc. swept by the source when the latter is in the lower position Na, and sections t1, t2, t3 . . . swept by the source when the latter is in the upper position N, are complementary and cover the entire height of the drill-hole. In this way, continuous irradiation may be obtained while the probe is lowered in a continuous movement.

FIGS. 7 and 8 are longitudinal sections of one example of embodiment of a probe for the execution of the method according to the invention.

The probe shown comprises a cylindrical element 16, of which only the lower end is visible. This element encloses an electric motor 17 adapted to rotate in both directions, for example a direct-current motor with a power of the order of 100 W. Through a friction clutch 18, this motor drives a polygonal or channelled rod 19 engaged in a worm 20 running in a nut 21 secured to the body of the probe. Worm 20 thus moves vertically upon being rotated.

Worm 20 supports a thrust race 21a carrying a support 22 in the form of a hollow tube to which are attached a particle detector 7, a screen 9, and two horizontal axes 23a, 23b each carrying a pulley 24a, 24b. An endless belt 25 runs over the two pulleys, and radioactive source 8 is secured to the said belt.

Worm 20 drives a shaft 26 carrying a pinion 28 which rotates pulley 24a by means of an intermediate pinion 29. The weight of sliding assembly 22 is compensated for by a calibrated spring which is compressed when the mobile assembly descends, and which returns the energy when the said assembly ascends.

Proximity detectors, or limit switches, 31, adjustable in height, are actuated by source 8 in the top and bottom positions. These automatically halt the movement of the source and the measuring phases. After a time delay T1, which is adjustable, devices 31 reverse the direction of displacement.

The source is displaced, in one direction or the other, by the run of the belt upon which it is mounted. The vertical movement of worm 20 produces vertical movements of support 22 in synchronism with the movements of the source. The reduction ratios of pinions 28,29 and the pitch of worm 20, are calculated to move support 22 between 30 and 40 cm when source 8 moves between 1 and 5 m. The vertical movements of detector 7 and screen 9 may be adjusted independently of the amplitude of the movements of support 22. To this end, detector 7 and screen 9 are placed on top of sliding support 22, with a resilient stop 32 therebetween, and they are suspended by a cable 15, the upper end of which is secured to the body of the probe.

Until such time as wire 15 becomes straight, the detector and the screen follow the descending movement of support 22, but their travel is limited to the length of wire 15, and this may be less than the distance travelled by support 22.

As a variant, worm 20 which slides around shaft 19 may be replaced by a threaded shaft 19 carrying a nut 21 which carries support 22 and moves vertically when the said shaft rotates. In this case, spring 30 is located below nut 21.

It is to be well understood that these figures represent merely one example of embodiment of a probe for the execution of the methods according to the invention, and that the component parts of this example may be replaced by parts performing equivalent functions without departing from the scope of the invention.

FIGS. 7 and 8 represent a probe which takes the diagraph when it is descending. Obviously the same principle may be used to design a probe which will take the diagraph when it is ascending. In this case, the relative positions of the detector and of the screen are reversed in relation to the source, and the drive-motor is located above the source.

The embodiments of the invention in which an exclusive property or privilege is claimed are defined as follows:

1. A prospecting method using radioactive diagraphy in a drill-hole comprising the steps of:
    vertically displacing in the said drill-hole, at a slow speed, a probe including a radioactive source, at least one particle detector and one screen placed between said radioactive source and said detector;
    periodically and rapidly displacing said source within the probe from a first position close to said at least one detector and at which the source bombards the terrain to be tested to a second position remote from said at least one detector;
    periodically and rapidly displacing said at least one detector and the screen placed between said detector and the source, within the probe, in synchronism with the source from a first position adjacent the first position of said source to a second position corresponding substantially to the first position of said source, whereby when the source is in the second position remote from said at least one detector said at least one detector is surrounded by the terrain which has been bombarded by the source when the source was in its first position close to said detector;
    and measuring with said detector, when the source is in said second position, the delayed radiation having a specific energy, which is emitted by the terrain surrounding the detector in its second position which was previously bombarded by the source.

2. A method according to claim 1 in which said probe includes two screens and two detectors placed on either side of the source, said method including the step of simultaneously displacing the two screens and detectors, within the probe, in synchronism with the source and in the same direction as the source so that the phases of measuring the delayed radiation carried out by each detector alternate.

3. A geophysical prospecting probe for radioactive diagraphy in a drill-home, said probe comprising a cylindrical casing which is vertically displaced in said drill-hole and which contains:
    an endless belt passing over two pulleys arranged one above the other;
    a radioactive source attached to the said belt;
    a reversible motor;
    a worm running parallel with the axis of the casing, the said worm being rotated by the said motor and, in turn, driving one of the said pulleys;
    a nut which is screwed into the said worm and is therefore caused thereby to move in translation and a support which carries a particle detector and a screen and which is integral in translation with the said mit.

4. A prospecting method using radioactive diagraphy in a drill-hole comprising steps of:
    vertically displacing in the said drill-hole, at a slow speed, a probe including a radioactive source, at least one particle detector and one screen placed between said source and said detector;
    periodically, rapidly and vertically reciprocating said source, within the probe, between a first and a second position and holding said source for a predetermined time in each such position;
    simultaneously with the source, rapidly and vertically displacing said detector and screen within the probe, between a first position adjacent the first position of the source and a second position which is substantially the first position occupied by the source and holding said detector and said screen for a predetermined time in each such position, and measuring with said detector, when it is in its second position, the delayed radiation, having a specific energy, which is emitted by the terrain surrounding the detector, which has been previously bombarded by the source when the latter was in the first position.

5. A prospecting method using radioactive diagraphy in a drill-hole comprising steps of:
    vertically displacing in the said drill-hole, at a slow speed, a probe including a radioactive source, at least one particle detector, and one screen placed between said source and each detector;
    periodically, rapidly and vertically displacing said source within the probe between a first position wherein the radiation emitted by the source has no direct influence upon said detector and a second position more remote from said detector than the first position, and maintaining said source for a predetermined time period in each of said first and second positions;
    displacing simultaneously with the source, within the probe, said detector and screen, by a distance which is less than the simultaneous displacement of the source and measuring with said detector, when the source is in said second position, the delayed radiation having a specific energy which is emitted by the terrain surrounding the detector which had been previously bombarded by the source when the source was in its first position.

6. A prospecting method using radioactive diagraphy in a drill-hole comprising the steps of:
    vertically displacing in the said drill-hole, at a slow speed, a probe including a radioactive source, at least one particle detector and one screen placed between said radioactive source and said detector;
    periodically, rapidly and alternatively displacing said source within the probe from a first position close to said detector to a second position more remote from said detector than the first position;
    periodically and rapidly displacing, within the probe, said detector and the screen placed between said detector and the source, in synchronism with the source in an alternating movement having an amplitude slightly less than the minimal distance separating the source from the said detector when the source is in said first position;
    and, while the source is in said second position remote from a detector, measuring with said detector the delayed radiation, having a specific energy, which is emitted by the terrain surrounding said detector which has been previously bombarded by the source when the source was in the first position.

7. A geophysical prospecting probe for radioactive diagraphy in a drill-hole comprising a cylindrical casing which is vertically displaced in said drill-hole and which includes:
a radioactive source,
at least one particle detector,
one screen placed between said detector and said source, and means for periodically, vertically, quickly and simultaneously moving, said source, said detector and said screen within said casing between first relative positions wherein the source is adjacent to said screen and to second relative positions wherein the source is remote from said screen and said detector is located at approximately the same position at which the source was located in its first position, said moving means including means for maintaining said source, said detectors and said screens in each of said first and second positions for a predetermined period of time.

8. A device according to claim 7, wherein the said casing contains:
an endless belt passing over two pulleys arranged one above the other;
a radioactive source attached to the said belt;
a reversible motor;
a worm running parallel with the axis of the casing, the said worm being rotated by the said motor and, in turn, driving one of the said pulleys;
a nut which is screwed onto the said worm and is therefore caused thereby to move in translation;
and a support which carries the said detector and a screen and is integral in translation with the said nut.

9. A device according to claim 8, in which the detector is located above the source in a vertical tube having two opposite ends, namely an open upper end and a closed lower end, the said tube being integral in translation with the nut, and the said detector being suspended by a wire adjustable in length, the upper end of the said wire being secured to the said casing in a manner such that the amplitude of the vertical displacements of the detector within the casing is equal to the variations in the length of the said wire and may be adjusted independently of the amplitude of the vertical displacements of the source.

* * * * *